United States Patent
Frey et al.

(10) Patent No.: US 10,787,121 B2
(45) Date of Patent: Sep. 29, 2020

(54) MULTIFUNCTION OPERATING DEVICE WITH ACTIVE AND PASSIVE HAPTIC

(71) Applicant: PREH GMBH, Bad Neustadt a. d. Saale (DE)

(72) Inventors: Markus Frey, Künzell (DE); Martin Schäfer, Hohenroth (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 0 days.

(21) Appl. No.: 16/178,742

(22) Filed: Nov. 2, 2018

(65) Prior Publication Data

US 2019/0152388 A1   May 23, 2019

(30) Foreign Application Priority Data

Nov. 20, 2017   (DE) .......................... 10 2017 127 231

(51) Int. Cl.
*B60Q 9/00*   (2006.01)
*B62D 15/02*   (2006.01)

(52) U.S. Cl.
CPC ............. *B60Q 9/00* (2013.01); *B62D 15/029* (2013.01)

(58) Field of Classification Search
CPC ................................ B60Q 9/00; B62D 15/029
USPC ........................................................ 200/600
See application file for complete search history.

(56) References Cited

U.S. PATENT DOCUMENTS

2019/0338561 A1*   11/2019   Wachinger .......... G06F 3/03547

FOREIGN PATENT DOCUMENTS

| DE | 19757929 C2 | 10/1999 |
| DE | 102008019124 A1 | 10/2009 |
| DE | 102015008573 A1 | 1/2017 |

* cited by examiner

*Primary Examiner* — Nguyen Tran
*Assistant Examiner* — Iman Malakoot
(74) *Attorney, Agent, or Firm* — M&B IP Analysts, LLC

(57) ABSTRACT

A multifunction operating device includes a carrier; an input part which has an input surface comprising an array of operating surfaces and which is to be mounted so as to be able to move relatively to the carrier; a touch sensor system which is designed to detect a touching of the input surface by an operating member of an operator, which touching is spatially resolved on the different operating surfaces, and to provide it as a touch detection result; a control unit electrically connected to the touch sensor system; an actuator electrically connected to the control unit and having an effective direction (W) for driving the input part so as to move it relatively to the carrier in order to generate an active haptic; the control unit is designed to trigger the active haptic depending on the touch detection result; an electromechanical switching element electrically connected to the control unit and arranged between the input part and the carrier in order to detect an actuation exerting a minimum actuating force on one of the operating surfaces by means of a switching operation of the electromechanical switching element and to optionally generate an associated mechanical switch haptic.

13 Claims, 4 Drawing Sheets

MULTIFUNCTION OPERATING DEVICE WITH ACTIVE AND PASSIVE HAPTIC

CROSS-REFERENCE TO RELATED APPLICATIONS

This application claims priority to the German Application No. 10 2017 127 231.3, filed Nov. 20, 2017, now pending, the contents of which are hereby incorporated by reference.

TECHNICAL FIELD

The present disclosure generally relates to a multifunction operating device.

BACKGROUND

Operating devices of the generic type serve to manually trigger and/or control different functions of one or a plurality of units, in particular of units of a motor vehicle, wherein a high integration density is sought to save construction volumes and components and is achieved by a plurality of different switch and control functions being assigned to an operating device. Multifunction operating devices are known in which a plurality of pushbuttons is combined to form an operating device, wherein each key defines an operating surface, so that an array of operating surfaces results with comparatively little constructional effort. A disadvantage of this solution is that in order to enable a separate actuation of the individual pushbuttons, the operating surfaces are generally separated from one another. Sealing of the gap, remaining between the operating surfaces is difficult. Even though an elastic input layer covering the various pushbuttons is conceivable, for example in the form of a membrane keyboard, this keyboard generally has an operating haptic perceived as less advantageous. Furthermore, touchpads or touchscreens are known in which the touch-sensitive input surface is subdivided into different, virtual operating surfaces and the contact areas are thus combined under a common input surface, which is thus regarded as advantageous because it is continuous. Solutions in which an additional switch haptic is assigned to these touchpads or touchscreens, with optionally present active touch haptic and detection haptic, are comparatively complex in construction.

It would be therefore advantageous to provide a structurally simplified construction for a multifunction operating device.

SUMMARY

Against this background, the some disclosed embodiments provide a space and weight-saving, vandalism-resistant and overall reliable multifunction operating device, in particular for use in a motor vehicle. This object is achieved according to the disclosed embodiments by a multifunction device having the features of claim 1. An equally advantageous use is the subject matter of the coordinate claim. Advantageous embodiments are respectively the subject matter of the dependent claims. It should be noted that the features stated separately in the claims may be combined in any technologically sensible manner and disclose further embodiments. The description, in particular in connection with the figures, further characterizes and specifies the disclosed embodiments.

One embodiment relates to a multifunction operating device, also referred to below as an operating device for short. This operating device comprises a carrier. The operating device also has an input part which has an input surface comprising an array of operating surfaces, for example a plurality of operating surfaces arranged next to one another. The input part is mounted so as to be able to move relatively to the carrier. The term "carrier" is to be interpreted broadly and it is in principle structurally designed to ensure a movement of the input part relative to the carrier while holding the input part at the same time. The carrier also serves, for example, to attach the operating device to further components, such as diaphragms or housings, for example interior claddings of a motor vehicle.

The multifunction operating device according to the embodiment further comprises a touch sensor system which is designed to detect a touching of the input surface spatially resolved on the different operating surfaces by an operating member, such as a finger, of an operator. For example, a capacitively, inductively or resistively detecting touch sensor system is provided. A capacitive touch sensor system is, for example, understood to be such a sensor system which generates an array of measurement capacities assigned to the input surfaces by means of an electrode array and is capable of detecting them from being influenced by an operating member of an operator in order to thus be able to have a control unit identify, i.e. assign, the touching to at least one of the operating surfaces of the plurality of operating surfaces.

According to some disclosed embodiments, a control unit electrically connected to the touch sensor system is consequently provided. Furthermore, an actuator electrically connected to the control unit is provided according to the disclosed embodiments. The actuator has an effective direction such that the input part is driven so as to move relatively to the carrier in order to generate an active haptic. The control unit is designed to trigger the active haptic, for example by means of an electrical control signal supplied to the actuator, when the touching of one of the operating surfaces is detected by the touch sensor system, in order to signal the detection and the touching of the relevant contact area to the operator via his haptic perception. By variation of the actuating signal, the active haptic can differ from one of the operating surfaces from that of a different operating surface or even from operating surface to operating surface. The actuator is, for example, a piezoelectric actuator. Preferably, it is an electromagnetic actuator. For example, the electromagnetic actuator comprises a coil arranged on the carrier side and an anchor arranged on the input part side, preferably a flat anchor.

According to some disclosed embodiments, an electromechanical switching element, preferably exactly one electromechanical switching element, arranged between the input part and carrier is provided in order to detect an actuation exerting a minimum actuating force of one of the operating surfaces by means of the operating member by triggering a switching operation and to optionally generate an associated mechanical switch haptic. The electromechanical switching element is electrically conductively connected to the control unit, so that the latter changes a switching state of a unit or performs a control function of the unit depending on the temporally preceding or simultaneous touch detection result, i.e. ultimately depending on the touch location spatially resolved with respect to the operating surfaces, when an actuation is detected.

The solution according to some disclosed embodiments, thus creates a multifunction operating device which is comparatively compact and robust but at the same time has a high integration density. By variation of the actuating signal provided to the actuator, for example, the variation possibility of the active haptic allows a comparatively reliable haptic detectability of individual operating surfaces, which may go so far that each individual operating surface is assigned an individualized detection haptic for confirming its touching in one embodiment.

In one embodiment, a further active haptic acknowledging actuation is generated by the actuator when actuation is detected by the switching operation of the electromechanical switching element. In this case, actuation of the actuator is preferably omitted, but a mechanical switch haptic, also called passive haptic, is provided by the switching element. For example, such a switching element generating a mechanical switch haptic is a metal dome pushbutton or a switch dome of elastomer material.

For advantageous decoupling of the movement excitation, for example oscillation excitation, provided for the active haptic and caused by the actuator from the displacement caused by the actuation, the multifunction operating device in a preferred embodiment has an intermediate carrier in relation to which the input part is mounted movably, preferably movably in a resetting manner, substantially parallelly to the input surface of the input part and parallelly to the effective direction of the actuator by means first mounting means. For example, the first mounting means comprise one or more leaf springs.

At the same time, the intermediate carrier in this embodiment is mounted so as to be displaceable relatively to the carrier in a direction of actuation orthogonal to the input surface by means of second mounting means when the input part is actuated, wherein the intermediate carrier interacts with the electromechanical switching element in a manner described above during displacement of the input part.

The second mounting means preferably have one or more brackets in order to mount the input part or the intermediate carrier on the carrier but also in order to stabilize the orientation of the input part during actuation. According to the disclosed embodiments, the mounting means have one or a plurality of brackets, for example comprising wire, which are pivotably mounted with a central portion about a first axis on the input part and with the free ends about a second axis parallelly offset to the first axis on the intermediate carrier. Thus, the formed bracket has the task, similar to that of a bracket in the structural design of the "space bar" of a keyboard, of preventing a tilting of the input part in case of a contact point of the actuating force that is non-centric in relation to the input surface by the bracket carrying along the opposite side of the input part by means of the mechanical coupling when the side of the input part that is primarily actuated by the eccentric actuation is pushed down. Tipping or tilting of the input part during the depressing actuating movement, i.e. during its displacement, is thus counteracted.

For improved guidance of the input part during displacement, a preferred embodiment provides guide means which have a plurality of pairs of respectively one guide groove and one guide rib engaging with the guide groove. The guide groove and/or the guide rib are more preferably tapered or conically reduced in the direction of actuation in order to act between the carrier and the intermediate carrier in a clearance-providing manner with increasing displacement of the intermediate carrier when the input part is actuated and to ensure reliable interaction of the intermediate carrier with the electromechanical switching element.

The intermediate carrier is preferably formed by a frame or a plate made of plastic, into which one or more weights made of a metal or a metal alloy are embedded in order to balance the oscillating system. For the wear-free storage of the first and/or second mounting means, the plastic is particularly preferred to be polyoxymethylene (for short: POM).

In one embodiment, in addition to the electromechanical switching element, a plurality of resetting means is arranged between the input part and the carrier, more precisely between the intermediate carrier and the carrier. The electromechanical switching element is preferably designed as the resetting means for resetting the input part into a rest position. More preferably, only the electromechanical switching element has a resetting effect on the input part or the intermediate carrier.

According to a preferred embodiment of the multifunction operating device, according to the disclosed embodiments, the input area is designed as a closed surface, i.e. the operating surfaces adjoin each other without any gaps, for example, or transition into one another.

The disclosed embodiments further relates to a steering wheel for a motor vehicle having a multifunction operating device in one of the embodiments described above. For example, the multifunction operating device is integrated into a spoke of the steering wheel connecting the steering wheel rim to the steering wheel hub.

The disclosed embodiments further relates to the use of the multifunction operating device according to one of the embodiments described above in a motor vehicle, in particular in a steering wheel.

BRIEF DESCRIPTION OF THE DRAWINGS

The disclosed embodiments is explained in more detail with reference to the following figures. The figures are to be understood only as examples and merely constitute preferred design variants. Shown are:

FIG. 1 shows an embodiment according of the multifunction operating device 1 in a top view, which is designed and intended for arrangement in a spoke (not shown) of a steering wheel. The multifunction operating device 1 has a carrier 3 made of a plastic, such as a thermoplastic, or ZAMAK. A multi-part input part 2 is movably mounted on the carrier 3 via an intermediate carrier not shown in FIG. 1. The input part 2 is surrounded by a frame 11 provided for optical reasons.

Figure 1:
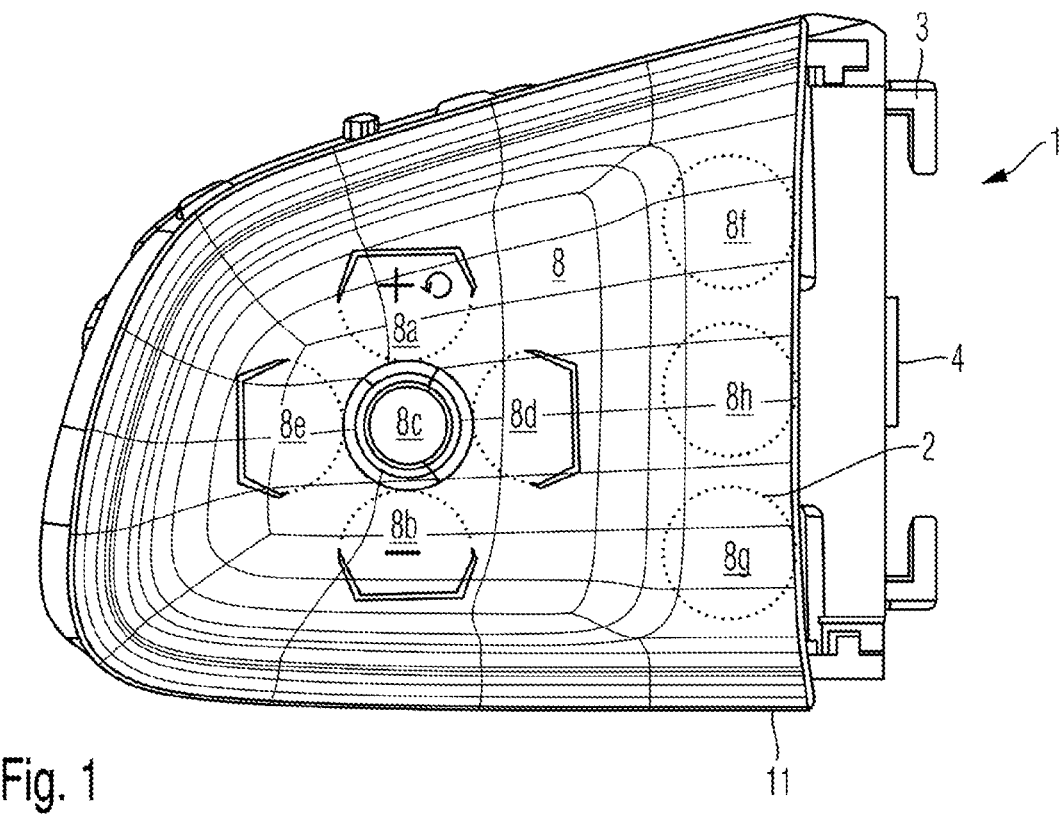
FIG. 1 is a top view of an embodiment of the multifunction operating device 1.

For generating a haptic feedback, also called active haptic, an actuator 4 is provided in order to drive so as to move, e.g. oscillate, the input part 2 relatively to the carrier 3. The input part 2 has a surface facing the operator not shown, in which surface defines the input surface 8 of the input part 2. The input surface 8 formed as a closed surface contains a plurality of operating surfaces 8a to 8h, which are arranged in an array and which are assigned different switch or control functions of a motor vehicle unit.

Figure 2:
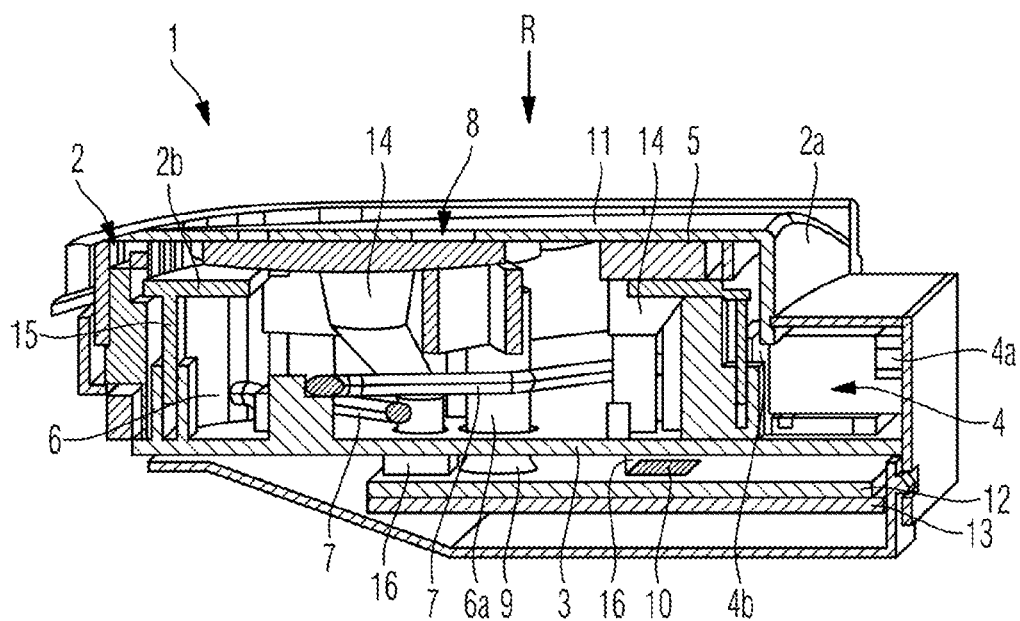
FIG. 2 is a sectional view of the multifunction operating device 1 from FIG. 1.

As FIG. 2 shows, the input part 2 has an upper hood 2a defining the input surface 8 and a bottom 2b. Between the hood 2a and the bottom 2b is arranged a foil layer structure containing the capacitive touch sensor system 5. The touch sensor system 5 is formed by an array of electrodes which forms an array of a plurality of measurement capacities passing through the input surface 8. The touch sensor system 5 allows touch detection which is spatially resolved with respect to the operating surfaces 8a to 8h.

Figure 3:
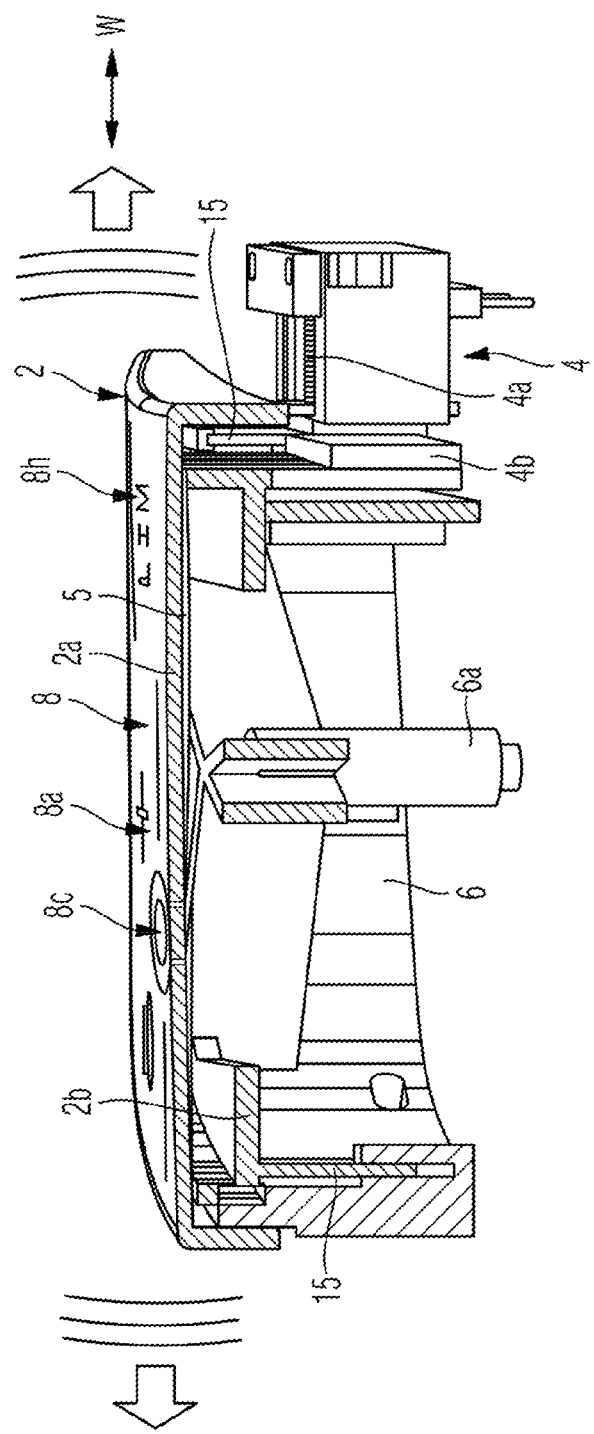
FIG. 3 is a detailed sectional view of the multifunction operating device 1 from FIG. 1.

The input part 2 is mounted by means of a plurality of leaf springs 15 so as to move oscillating in a direction parallel to the input surface 8 relatively to an intermediate carrier 6 and thus relatively to the carrier 3. As can be seen from FIG. 3, the degree of freedom from oscillations of the input part 2 during motorized excitation by the electromagnetic actuator 4 with correspondingly effective direction W creates the possibility of producing a deflection or oscillation of the input part 2, which oscillation can be perceived hepatically by the user through the finger resting on the input surface 8 and serves as detection haptic for the operating surfaces 8a to 8h or a specific one of the operating surfaces 8a to 8h.

Depending on the touch detection result of the touch sensor system, whether, for example, one of the operating surfaces 8a to 8h was touched, or even depending on the specific operating surface 8a to 8h selected and touched by the finger, an active haptic or even an active haptic that varies depending on the touch location is generated in order to facilitate the detection of the operating surfaces 8a to 8h or even of a specific individual one of the operating surfaces 8a to 8h.

For generating the active haptic, the electromagnetic actuator 4 has a magnetic coil 4a fixed on the carrier 3 and a flat anchor 4b interacting with the magnetic field of the magnet coil 4a and fixed on the input part 2. As FIG. 2 shows, the input part 2 can be pressed down under the influence of an actuating force in relation to the carrier 3 in a direction of actuation R orthogonal to the input surface 8 and can thus be displaced.

Figure 4:
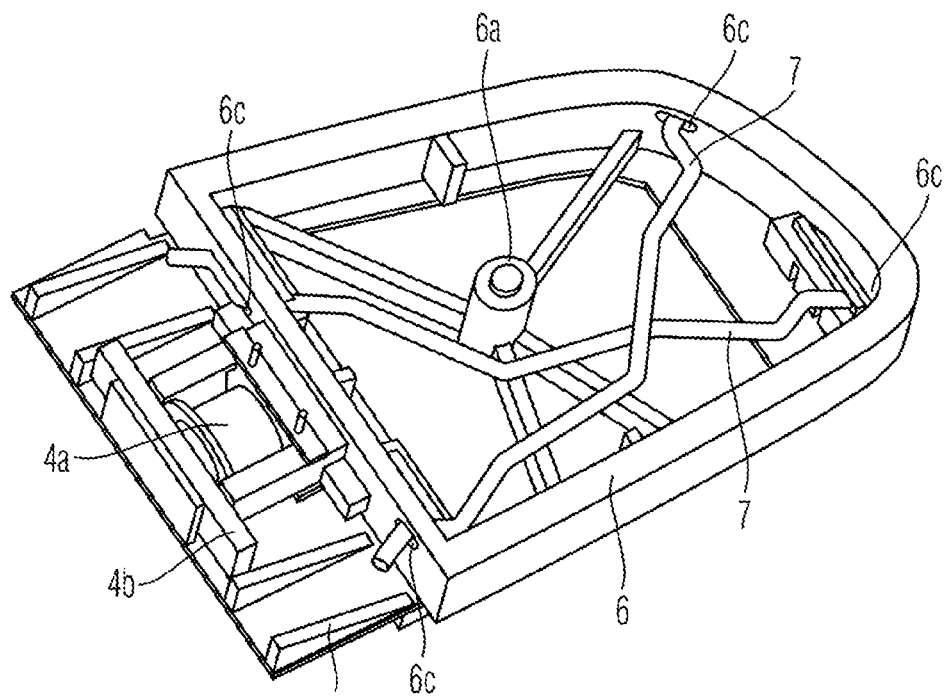
FIG. 4 is a perspective detailed rear view of the multifunction operating device 1 from FIG. 1.
Figure 6:
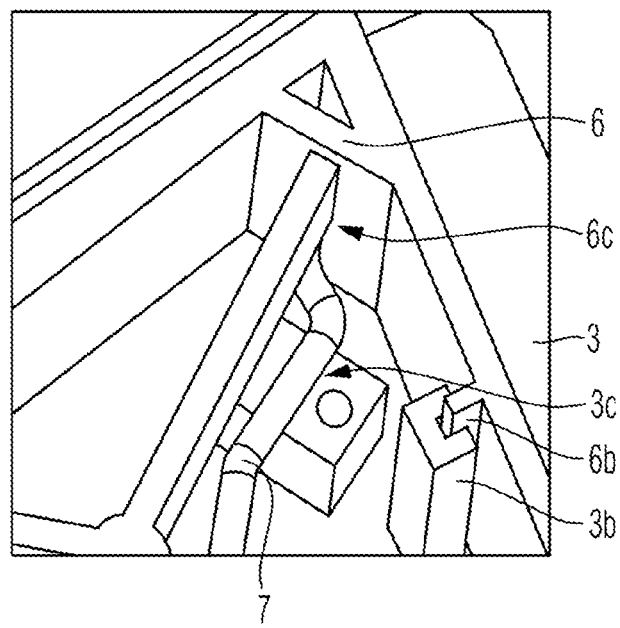
FIG. 6 is a further detailed view of the multifunction operating device 1 from FIG. 1, of the mounting means 7, inter alia.

This results from mounting means 7 in the form of wire brackets, by means of which the intermediate carrier 6 is mounted on the carrier 3. As FIGS. 4 and 6 show, these brackets 7 are pivotably mounted with their ends in recesses 6c of the intermediate carrier 6 about a second axis, while as FIG. 6 shows, the brackets 7 are each pivotably supported via their central portion on a bearing block 3c of the carrier 3 about a first axis, wherein the first axis and the second axis per respective bracket 7 respectively extend in parallel offset to each other. The brackets 7 serve to hold and stabilizing guide the intermediate carrier 6 and thus the input part 2 along the direction of actuation R. During this displacement, the intermediate carrier 6 acts via its pin 6a on an electromechanical switching element 9 in the form of a switching dome formed by a switching mat 12 which in turn closes an electrical contact provided on a printed circuit board 13 by means of a contact lens not shown. The switching element 9 not only provides the resetting force to be overcome during the actuation and necessary for resetting the input part 2 into the unactuated position, i.e. the rest position, but also ensures the generation of a hepatically perceptible mechanical switch haptic when it "collapses." By closing the contact arranged on the printed circuit board 13, the switching element 9 ensures a switching operation when a predetermined actuating force acting on the input part is exceeded, which switching operation can be detected by a control unit 10 electrically connected to the switching element 9, which control unit in turn is connected to the touch sensor system 5. Depending on the touch detection result of the touch sensor system 5 and triggered by the detection of the switching operation of the switching element 9, the control unit 10 assigns to the actuation a switch and control function, which corresponds to the operating surface 8a to 8h, of a non-illustrated vehicle unit, for example a multimedia device or a cruise control.

In order to back-light the illuminated surfaces assigned to the operating surfaces 8a to 8h and respectively forming a symbol, one or more illuminants 16 are arranged on the printed circuit board 13, the light of which illuminants is guided to the respective illuminated surface via a plurality of column-shaped light guides 14 passing through the intermediate carrier 6.

Figure 5:
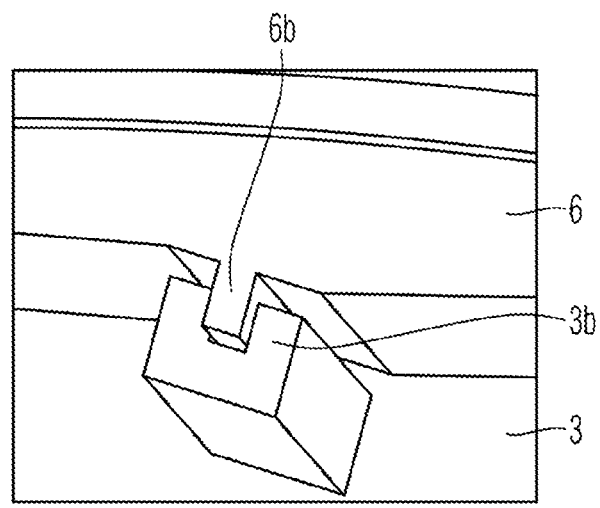
FIG. 5 is a detailed view of the multifunction operating device 1 from FIG. 1, of the guide means 3b, 6b, inter alia.
Figure 7:
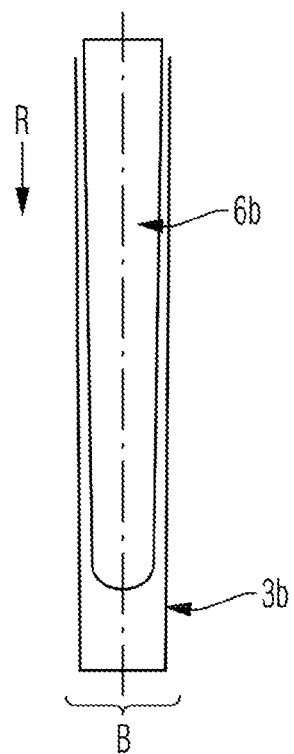
FIG. 7 is yet another sectional view of the guiding means 3b, 6b of the multifunction operating device from FIG. 1.

As shown in FIGS. 5 to 7, guide means 3b, 6b are also provided which serve to mechanically guide the input part 2 or the intermediate carrier 6 relatively to the carrier 3. The guide means 3b, 6b comprise a plurality of pairs of respectively one guide groove 3b formed by the carrier 3 and one guide rib 6b engaging with the guide groove 3b and formed by the intermediate carrier 6. As FIG. 7 shows, the guide groove 3b is designed in such a way that the gap width B defined by guide groove continuously and constantly decreases from top to bottom, i.e. in the direction of actuation R. The guide rib 6b likewise tapers in the direction of actuation R. The displacement of the intermediate carrier 6 following the actuation of the input part 2 thus provides a clearance between the intermediate carrier 6 and the carrier 3.

What is claimed is:

1. A multifunction operating device, comprising
a carrier;
an input part which has an input surface comprising an array of operating surfaces and which is to be mounted so as to be able to move relatively to the carrier;
a touch sensor system that is configured to detect a touching of the input surface by an operating member of an operator, wherein the touching is spatially resolved on the different operating surfaces, and provided as a touch detection result;
a control unit electrically connected to the touch sensor system;
an actuator electrically connected to the control unit and having an effective direction for driving the input part so as to move the input part relatively to the carrier in order to generate an active haptic, the control unit configured to trigger the active haptic depending on the touch detection result; and
an electromechanical switching element electrically connected to the control unit and arranged between the input part and the carrier in order to detect an actuation exerting a minimum actuating force on one of the operating surfaces by means of a switching operation of the electromechanical switching element and to generate an associated mechanical switch haptic, wherein:
the control unit is configured to assign the actuation to a switch function or a control function depending on the touch detection result; and
the mechanical switching haptic is generated by the electromechanical switching element and detected by the control unit, while omitting the active haptic generated by the actuator, when the switching operation occurs.

2. The multifunction operating device according to the claim 1, further comprising:

an intermediate carrier in relation to which the input part is mounted movably, movably in a resetting manner, substantially parallel to the input surface and in the effective direction by means of first mounting means, wherein the intermediate carrier is mounted so as to be displaceable relatively to the carrier in a direction of actuation orthogonal to the input surface by means of second mounting means when the input part is actuated, wherein the intermediate carrier interacts with the electromechanical switching element during the displacement.

3. The multifunction operating device according to claim 2, wherein the second mounting means have one or more brackets for stabilizing the orientation of the input part during actuation.

4. The multifunction operating device according to claim 3, further comprising: guide means having a plurality of pairs of respectively one guide groove and one guide rib engaging with the guide groove.

5. The multifunction operating device according to claim 4, wherein the guide groove tapers in the direction of actuation and/or the guide rib conically reduces in the direction of actuation in order to provide clearance between the carrier and the intermediate carrier with increasing displacement of the intermediate carrier when the input part is actuated.

6. The multifunction operating device according to claim 1, wherein the actuator is an electromagnetic actuator.

7. The multifunction operating device according to claim 2, wherein the intermediate carrier is formed by a frame or plate made of plastic, into which one or more weights comprising a metal or a metal alloy are embedded.

8. The multifunction operating device according to claim 1, wherein the switching element is configured as a resetting means for resetting the input part into a rest position.

9. The multifunction operating device according to claim 1, wherein the input surface is configured as a closed surface containing the array of operating surfaces.

10. The multifunction operating device according to claim 1, wherein the touch sensor system is configured to detect the touch capacitively.

11. A steering wheel for a motor vehicle having a multifunction operating device according to claim 1.

12. Use of the multifunction operating device according to claim 1 in a motor vehicle.

13. The multifunction operating device according to claim 1, wherein the active haptic varies corresponding to a variation in the input surface touched.

* * * * *